Patented Feb. 9, 1932

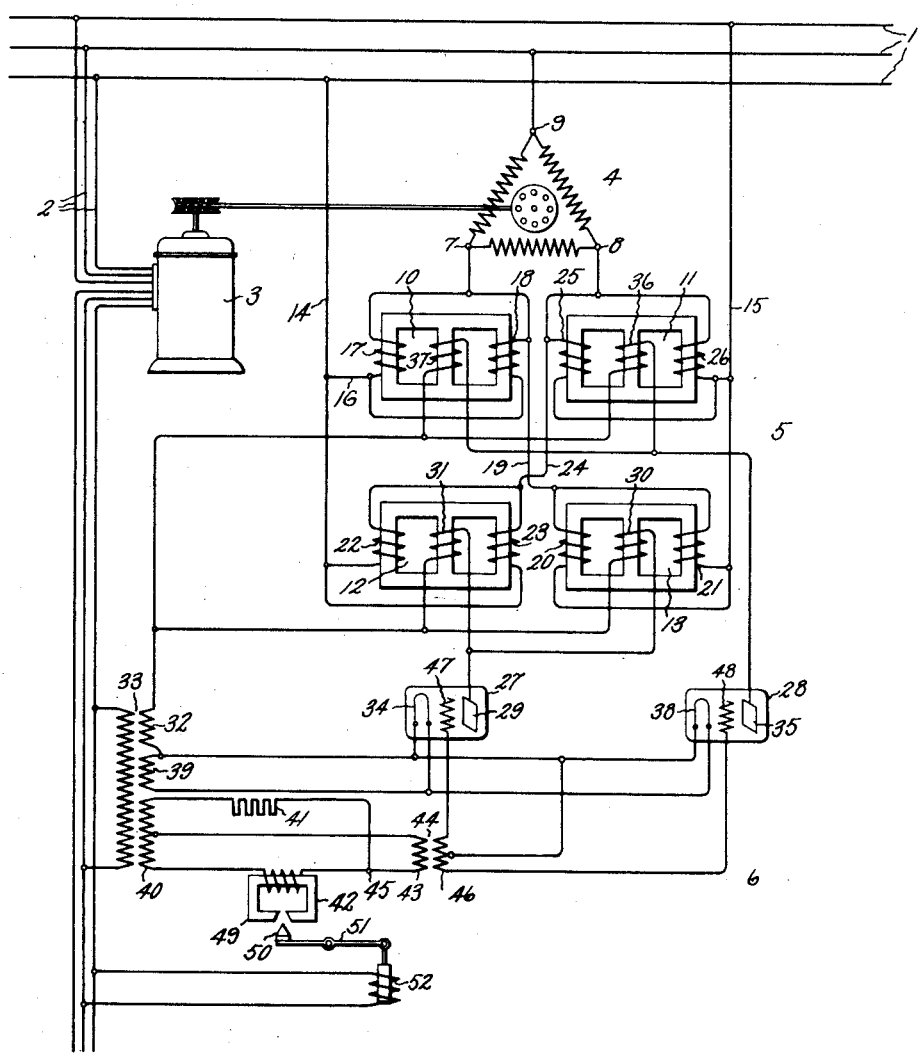

1,844,704

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

ELECTRICAL CONTROL SYSTEM

Application filed August 28, 1930. Serial No. 478,462.

My invention relates to electrical control systems and particularly to control systems for the operating means of induction voltage regulators.

Induction voltage regulators, which are essentially auto-transformers whose windings are relatively displaceable, are extensively used to provide a regulable voltage buck or boost in feeder circuits so as to maintain constant voltage under varying load conditions. The windings of each regulator are moved relatively to each other by a small fractional horsepower reversible motor. Heretofore this motor has been controlled through a power relay by a delicate contact making voltmeter. As it frequently happens that the load changes on a feeder circuit fluctuate rapidly for considerable periods of time, the contacts of the relay and voltmeter are called upon to make and break their respective circuits very often, thus subjecting this delicate mechanism to a fairly continuous operation and mechanical wear. As a consequence it is one of the weak links in a system of voltage regulation employing induction regulators.

In accordance with my invention I provide a novel system of control, for the operating motor of such systems, which does not require the opening and closing of circuits. The operation of the illustrated and preferred embodiment of my invention depends upon the well known fact that the direction of rotation of a three phase motor may be reversed by reversing any one of its phase connections. This reversal of connections I attain by connecting each of the terminals of one of the phases of the motor to two of the supply conductors through variable current limiting devices whose relative magnitudes are varied without opening an electric circuit to reverse the instantaneous direction of the current flow in the motor. My invention, however, is not limited to use in three phase systems and it will become apparent to those skilled in the art, as the description of my invention proceeds, that the reversing means embodied in my invention is applicable to many different kinds of translating devices and is capable of use in many different kinds of systems.

An object of my invention is to provide a new and improved control system.

Another object of my invention is to provide an electrical regulating system embodying a new and improved control system.

My invention will be better understood from the following description taken in connection with the accompanying drawing and its scope will be pointed out in the accompanying claims.

Referring now to the single figure of the accompanying drawing, which illustrates diagrammatically a preferred embodiment of my invention, the main elements of the regulating system embodying my novel control means are the three phase supply circuit 1, the feeder circuit 2 connected thereto, the induction regulator 3 for regulating the voltage of feeder circuit 2, the operating motor 4 for the regulator 3, the means, indicated generally by reference character 5, for controlling and reversing the motor connections and the means, indicated generally by reference character 6, for controlling the means 5 in response to voltage changes on feeder circuit 2.

Regulator 3 may be of any well known design and as such regulators are well understood by those skilled in the art a detailed description and showing of it is believed to be unnecessary.

Motor 4 may be of any suitable reversible self-starting type. It need not necessarily be a three phase motor, although a three phase mesh connected induction motor has been shown. All that is necessary is that the motor have an element which reverses the motor torque as a result of a reversal of the current through it. One such motor is the one illustrated, for with a reversal of the connections of terminals 7 and 8, of motor 4, between any two of the conductors of circuit 1, terminal 9 being connected to the remaining conductor, the instantaneous current in the windings of this motor will reverse, thus reversing the direction of the rotating field produced by them and consequently reversing the direction of rotation of the motor. As shown, terminal 9 of motor 4 is permanently connected to the center conductor of circuit 1. Terminals 7 and 8 are connected to the outer conductors of this circuit through means 5 for reversing the instantaneous direction of current flow therebetween.

Current reversing means 5 comprises essentially four similar current limiting impedances, in the form of saturable reactors 10, 11, 12 and 13, connected as a Wheatstone bridge.

These saturable reactors may be of any well known construction although the specific type illustrated is preferred as it has the advantage of not producing even harmonics by the unequal distortion of the two halves of the alternating current wave, such as is the case with a simple saturable reactor wherein the magnetic circuits for the direct current and alternating current produced fluxes are coextensive. As shown, each of these reactors comprises a three-legged core on each of whose outer legs is wound a separate alternating current coil. These coils are connected in parallel in such a manner that their magneto motive forces are additive throughout the magnetic circuit including the outer legs of the core. On the center leg of the core of each reactor is wound a direct current saturating winding.

Reactors 10 and 13 are connected in series between the outer conductors of supply circuit 1 by means of conductors 14 and 15. Tracing this circuit we have, conductor 14, conductor 16, coils 17 and 18 in parallel, conductor 19, coils 20 and 21 in parallel to conductor 15. Likewise reactors 11 and 12 are connected in series between conductors 14 and 15 by the following circuit, conductor 14, coils 22 and 23 in parallel, conductor 24, and coils 25 and 26 in parallel to conductor 15. Terminal 7 of motor 4 is connected to the midpoint of the series circuit containing reactors 10 and 13 while terminal 8 is connected to the midpoint of the series circuit containing reactors 11 and 12. It will thus be seen that conductors 14 and 15 are connected to what may be referred to as the input terminals of the Wheatstone bridge while terminals 7 and 8 are connected to what may be referred to as the output terminals of the bridge. If now the impedances of reactors 10 and 11 are made greater than the impedances of reactors 12 and 13 the instantaneous current flow between terminals 7 and 8 will be in one direction while if the impedances of reactors 10 and 11 are made less than the impedances of reactors 12 and 13 this instantaneous current flow will reverse. In this manner the direction of rotation of motor 4 may be reversed. It will occur to those skilled in the art, however, that my invention is not limited to the use of four variable impedance devices and that two variable and two fixed impedance devices connected as a Wheatstone bridge could also be used to get a reversal of current flow in motor 4. Thus if reactors 10 and 12 were left uncontrolled and only reactors 11 and 13 were varied, or vice versa, current reversal in the motor would be obtained, although the range of control would not be as great as when all four reactors are controlled. This would be true to a greater extent if the bridge were unbalanced by controlling only one reactor.

The means for controlling the saturation, and hence the impedance, of the reactors comprises a pair of electric discharge devices or vacuum tubes in the form of grid controlled arc discharge devices 27 and 28. These devices are well known in the art and differ primarily from the usual three element high vacuum tube in that they contain a small quantity of inert gas, such as mercury vapor. In such tubes the plate current is largely produced by gaseous ions which in turn are produced by collision of the gas molecules and the electrons emitted by the hot cathode or filament whereas in the usual high vacuum tube the plate current is wholly produced by the electrons emitted from the filament. Consequently the discharge in such devices partakes of the nature of an arc discharge and although the time of starting of this arc can be controlled by the grid, the arc cannot thereafter be affected. With an alternating potential applied to the plate of such a device it acts as a rectifier and the average current passed by it can be controlled with the grid by varying the time in each alternate half cycle when the arc starts. The arc in such devices starts, assuming of course that the plate is positive with respect to the filament, whenever the grid potential is above a certain critical value, which in actual practice is a potential that is slightly negative with respect to the plate potential.

One well known way of controlling the starting of the arc, which is the way that I have shown, comprises impressing on the grid an alternating potential of the same frequency as the plate potential and then varying the phase relation of these potentials. Thus when the grid and plate potentials are in phase the arc will start almost as soon as the plate becomes positive with respect to the filament because of the fact that the grid potential is also positive and above the critical value. Now if the grid potential is made to lead the plate potential a position will soon be reached when the grid potential is negative and below the critical starting value when the plate potential first becomes positive. The discharge will then be prevented from starting during the first portion of the half wave. By varying this degree of phase displacement the time of starting and hence the average current passed by the tubes can be accurately controlled.

Discharge device 27 supplies the saturating currents for reactors 12 and 13, the circuit being from plate 29, saturating windings 30 and 31 in parallel, secondary winding 32 of transformer 33 to filament 34. Likewise discharge device 28 supplies the saturating current for reactors 10 and 11 through the following circuit, plate 35, saturating windings 36 and 37 in parallel, secondary winding 32 to filament 38. Filaments 34 and 38 are energized from the secondary winding 39 of transformer 33.

The phase shifting device for the grid potentials comprises a network consisting of the secondary winding 40 of transformer 33, across which are connected in series a resistance 41 and a variable reactance 42, the primary winding 43 of a grid transformer 44 being connected between the midpoint of the secondary winding 40 and the common terminal 45 of the resistance 41 and reactance 42. By varying the reactance device 42 the phase relation of the voltage of primary winding 43 of transformer 44 with respect to the voltage of secondary winding 40 may be varied from in phase through a quadrature relation to 180° out of phase. This will become apparent from the following considerations. The voltage drop across secondary winding 40 is made up of two components, namely, the drop in resistance 41 and the drop in reactance 42. The vector sum of these drops must, of course, always be equal in magnitude to the voltage of secondary winding 40. These drops must also be at all times in quadrature with respect to each other. A little reflection will therefore render it clear that when the relative values of the resistance and reactance are varied the potential of point 45 moves on the arc of a circle whose diameter is determined by the voltage of secondary winding 40, for it is the well known property of a circle that the chords joining any point on its arc to the ends of a diameter are perpendicular to each other. Therefore, as one terminal of primary winding 43 connects to point 45 and the other terminal connects to the midpoint of secondary winding 40, the voltage of primary winding 43 is vectorially the radius of a circle whose diameter is the voltage of secondary winding 40. The above all presupposes that little or no current is taken by transformer 44, for otherwise such a current would distort the above described relation. That little or no current is taken by transformer 44 is clear from the fact that this transformer merely acts to vary the grid potentials of tubes 27 and 28. The above described phase shifting device is well known in the art and is used merely as a convenient way of controlling the grids of devices 27 and 28 without the necessity of making and breaking circuits by contacts.

Secondary winding 46 of transformer 44 has its midpoint connected to the filaments 34 and 38 and its end points connected to grids 47 and 48. It is therefore clear that the grid potentials are 180° out of phase with each other at all times.

Reactance 42 may be varied in accordance with variations in the voltage of circuit 2 by any suitable means and in the illustrated embodiment it is provided with a split core 49 and a movable wedge shaped member 50 for varying the length of the air gap and hence the magnitude of the reactance, the reactance increasing as the air gap is decreased. Member 50 is mounted on a pivoted lever 51 which is actuated by a magnet 52 connected to be responsive to the voltage of circuit 2. This feature of controlling an electric valve by automatically varying the air gap in the magnetic circuit of a reactor which is a part of a grid potential phase shifting circuit for the valve forms no part of my present invention and is disclosed and claimed in an application of George E. Stack, Serial No. 464,094, filed June 26, 1930, and assigned to the assignee of the present application.

The operation of the illustrated embodiment of my invention is as follows. Assume that supply circuit 1 is being energized by a suitable source of current (not shown) and that normal voltage exists on feeder circuit 2. Under these circumstances regulator 3 will be at rest, as there is no need to produce a voltage buck or boost in circuit 2, which means that the bridge consisting of reactors 10, 11, 12 and 13 is balanced so that no voltage is impressed between terminals 7 and 8 of motor 4 and consequently no torque is produced by this motor. In order that the bridge be balanced each of the reactors must have the same ohmic impedance which in turn means, assuming identical reactors, that each of the saturating windings carry the same current and obviously this can only be achieved when discharge devices 27 and 28 are passing the same current. To attain this result the grids of these devices should start the latter's respective discharges at the same time so that the average current in each tube is the same. This would happen, for example, if just when the plate voltages of the tubes have passed through zero and are becoming positive, the grid potential of tube 27 was still negative but was passing through the critical starting value in a positive direction while the potential of the grid 48 of device 28, which it will be remembered is 180° out of phase with the other grid potential, is positive although decreasing in value.

If now the voltage of circuit 2 should depart from normal, for example if it should decrease as a result of the voltage drop produced by an increase in load connected to it, the pull of magnet 52 would be weakened, wedge 50 would move to change the air gap in core 49 and hence the reactance of reactor 42 would change. This would change the phase relation of the grid potentials to the plate potentials of the discharge devices, as previously explained, with the result that one of the discharge devices would start earlier than the other. Consequently the currents through the discharge devices would be different causing the values of reactors 10 and 11 to change with respect to reactors 12 and 13. Consequently the bridge will be unbalanced and a voltage will appear between terminals 7 and 8 of the motor 4, thus completing a three phase excitation of this motor with the result that it produces a starting torque. By properly choosing the motor connections this torque can be made to coincide with the direction of rotation of regulator 3 which produces a voltage boost. The motor 4 will then continue to turn regulator 3 until the voltage is restored to normal, when wedge 50 will return to its normal position, thus shifting the phase of the grid potentials, with the result that the bridge is again balanced and the motor comes to rest.

Similarly, a rise in voltage on circuit 2 will cause an opposite movement of wedge 50, by means of magnet 52, thus changing the phase of the grids in the opposite direction with the result that the bridge will be unbalanced in such a way as to cause a reversal of motor 4. This will cause the regulator to restore the voltage at which time equilibrium will again be established.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. A control system having, in combination, an alternating current circuit, a translating device, means including a pair of single direct current winding saturable reactors for connecting said translating device to said circuit, said means determining the relative direction of current flow in said translating device with respect to the direction of current flow in said circuit in accordance with the relative impedances of said reactors, and means for varying the relative saturation of said reactors by varying the relative value of the direct current in the single direct current winding of said reactors.

2. A control system having, in combination, an alternating current circuit, a translating device connected thereto, means including a pair of impedance devices whose relative impedances determine the direction of operation of said translating device, and a pair of electric discharge devices for respectively oppositely varying the values of said impedance devices.

3. A control system having, in combination, an alternating current circuit, a dynamo electric machine having a winding energized from said circuit, a pair of current limiting devices whose relative current limiting values determine the instantaneous direction of current flow in said winding, and a pair of grid controlled arc discharge devices for respectively oppositely varying the current limiting values of said current limiting devices.

4. In combination, an alternating current circuit, a translating device, four single direct current winding saturable reactors connected to form a Wheatstone bridge having two sets of two terminals, one set being connected to said circuit, the other set being connected to said translating device, and means for varying the saturation of said reactors in a manner to unbalance said bridge in either direction through oppositely varying the current in different pairs of said direct current windings.

5. In combination, an alternating current circuit, a translating device, four saturable reactors connected to form a Wheatstone bridge having two sets of two terminals, one set of terminals being connected to said circuit, the other set of terminals being connected to said translating device, and means including a pair of electric discharge devices for respectively oppositely varying the saturation of pairs of said reactors so as to unbalance said bridge.

6. In combination, a polyphase electric circuit having a plurality of conductors, a reversible translating device having a plurality of terminals connected respectively to said conductors, variable current limiting means between two of said conductors and two of said terminals, other variable current limiting means reversely connecting said two terminals to said two conductors, and means for varying the relative values of said current limiting means.

7. In combination, a three phase power supply circuit having three conductors, a three phase motor having three terminals, variable reactance means connecting two of said terminals to two of said conductors, other variable reactance means reversely connecting said two terminals to said two conductors, means connecting the remaining terminal to the remaining conductor, and means for varying the relative values of said reactance means.

8. In combination, a three phase power supply circuit having three conductors, a three phase motor having three terminals, saturable reactance means connecting two of said terminals to two of said conductors respectively, additional saturable reactance means reversely connecting said two terminals to said two conductors respectively, means for varying the relative saturation of said reactance means, and means connecting the remaining terminal of said motor to the remaining conductor of said circuit.

9. In combination, a three phase electric circuit having three conductors, a three phase dynamo electric machine having three terminals connected respectively to said conductors, variable impedance means connected between two of said terminals and their associated conductors, additional variable impedance means reversely connecting said two terminals and their associated conductors, and means responsive to an electrical condition of said circuit for varying the relative values of said impedance means.

10. In combination, a three phase alternating current circuit having three conductors, a three phase alternating current motor, a pair of saturable reactors connected in series between two of said conductors, a second pair of saturable reactors connected in series between said two conductors, means connecting two of the terminals of said motor between the common terminals of each pair of reactors, means connecting the remaining terminal of said motor to the remaining conductor of said circuit, and means responsive to the voltage of said circuit for varying the relative saturation of said reactors.

11. In combination, a polyphase alternating current circuit having a plurality of conductors, a polyphase dynamo electric machine having a plurality of terminals, variable impedance paths connecting two of said terminals to two of said conductors, additional variable impedance paths reversely connecting said two terminals to said two conductors, and means including controllable electric discharge devices for relatively varying the impedance of two of said paths with respect to the impedance of the other two paths.

12. In combination, a three phase alternating current circuit having three conductors, a three phase reversible motor having three terminals, means connecting one of said terminals to one of said conductors, a pair of saturable reactors connected in series between the remaining two conductors, a second pair of saturable reactors connected in series between said remaining two conductors, means connecting the remaining terminals of said motor between the electrically common terminals of each pair of saturable reactors, and means including grid controlled arc discharge devices for controlling the saturating current for said reactors.

13. In combination, a polyphase alternating current circuit having a plurality of conductors, a polyphase dynamo electric machine having a plurality of terminals, means connecting one of said conductors to one of said terminals, a Wheatstone bridge comprising four controllable current controlling devices, means connecting opposite points of said bridge between two of the remaining conductors, means connecting the remaining opposite points of said bridge between the remaining terminals of said dynamo electric machine, grid controlled electric discharge devices for controlling said current controlling devices, and means responsive to an electrical condition of said alternating current circuit for controlling the grids of said discharge devices.

14. In combination, a three phase circuit having three conductors, a three phase motor having three terminals, saturable reactors connected in the form of a Wheatstone bridge, means connecting two opposite points of said bridge between two of said conductors, means connecting the remaining two opposite points of said bridge between two of said terminals, means connecting the remaining terminal to the remaining conductor, grid controlled arc discharge devices for supplying saturating current to said reactors, and means responsive to the voltage of said circuit for controlling the grid potential of said arc discharge devices.

15. A regulating system having, in combination, a polyphase alternating current circuit having a plurality of conductors, an induction regulator connected in said circuit, a reversible motor for operating said regulator, said motor having a plurality of terminals, four current limiting devices connected in the form of a Wheatstone bridge, means connecting two opposite points of said bridge between two of the conductors of said circuit, means connecting two of the terminals of said motor between the two remaining opposite points of said bridge, and means responsive to an electrical condition of said circuit for controlling said current limiting devices.

16. A regulating system having, in combination, a three phase alternating current circuit having three conductors, an induction regulator connected therein, a three phase reversible motor for operating said regulator, said motor having three terminals, four variable reactance devices connected to form a Wheatstone bridge having input and output terminals, means connecting said input terminals between two of the conductors of said circuit, means connecting the output terminals of said bridge between two of the terminals of said motor, means connecting the remaining terminal of said motor to the remaining conductor of said circuit, electric discharge devices for controlling the magnitude of said reactances, and means responsive to an electrical condition of said circuit for controlling said electric discharge devices.

17. A regulating system having, in combination, a three phase power supply circuit, a feeder circuit having three conductors connected thereto, an induction voltage regulator connected in said feeder circuit, a three phase induction motor connected to operate said regulator, said motor having three terminals, four saturable reactors connected in the form of a Wheatstone bridge having input and output terminals, said input terminals being connected between two of the conductors of said feeder circuit, said output terminals being connected to two of the terminals of said motor, the remaining conductor of said feeder circuit being connected to the remaining terminal of said motor, grid controlled arc discharge rectifying devices for supplying variable saturating current to said reactors, and means responsive to changes in the voltage of said feeder circuit for reversely varying the phase of the voltage applied to the grids of said arc discharge devices.

In witness whereof, I have hereunto set my hand this 27th day of August, 1930.

LOUIS W. THOMPSON.